United States Patent Office 2,779,763
Patented Jan. 29, 1957

2,779,763

PROCESS FOR THE PRODUCTION OF REACTION PRODUCTS OF CYANURIC CHLORIDE WITH AMMONIA IN THE GAS PHASE

Hans Huemer, Frankfurt am Main, Germany, assignor to Deutsche Gold- und Silber-Scheideanstalt vormals Roessler, Frankfurt am Main, Germany No Drawing. Application September 21, 1953, Serial No. 381,490

7 Claims. (Cl. 260—249.7)

The present invention relates to a novel process for the production of reaction products of cyanuric chloride with ammonia in the gas phase.

The reaction of cyanuric chloride with aqueous ammonia is already known to produce triazines carrying 2 or 3 amino substituents, that is, diamino-monochlor triazine and melamine, depending upon the temperature employed.

In accordance with the invention, it has been unexpectedly found that cyanuric chloride will react with ammonia in the gas phase at atmospheric pressure in the absence of water at elevated temperatures, for example, a little above 250° C. and that depending upon the conditions of the reaction 1, 2 or 3 chlorine groups are replaced by amino groups. The degree of substitution depends both upon the temperature of the reaction and the time the reactants remain in the reaction zone. The critical limits are not clearcut, but it has nevertheless been ascertained that in the production of mono and disubstituted products the time the reactants remain in the reaction zone is more critical than the reaction temperature.

Contrary to the known processes which are carried out in an aqueous medium, the process according to the invention renders it possible also to obtain monoamino substituted dichlorotriazines. For example, when employing very short reaction times, which amount to fractions of a second and temperatures under 400° C., i. e., essentially within the range of 300 to 400° C., primarily only one of the three chlorine atoms of the cyanuric chloride is substituted by an amino group.

When the reaction time is increased, for example, to over 3 seconds, preferably 4 to 5 seconds, the primary reaction product is mono chlor-diamino-triazine and only relatively minor quantities of dichlor-monoamino-triazine are obtained.

When the temperature is also varied, it is possible to obtain all possible intermediate variations in the content of the reaction product in dichloro-monoamino-triazine and monochloro-diamino-triazine. A mixture of equal parts of each is, for example obtained when the reaction time is maintained below about one second and the reaction temperature employed is over 400° C., i. e., about 400° to 450° C. If, on the other hand, it is desired to obtain monochloro-diamino-triazine as the primary reaction product, a longer reaction time, for example 4 to 5 seconds and a temperature of 420 to 480° C. whereby a reaction product is obtained which contains about 85% of monochloro-diamino-triazine and 15% of dichloro-monoamino-triazine. If extreme reaction periods and temperatures are employed, it is also possible to substitute all three chlorine atoms of the cyanuric chloride to obtain melamine. The conversion to melamine is, however, not always satisfactory. It has been found, however, that the conversion to melamine can be increased considerably up to nearly quantitative conversion with the aid of catalysts such as cuprous chloride, active carbon, barium chloride and other catalysts promoting splitting off of hydrogen chloride either alone or in combination, employing active carbon as a carrier.

The conditions of the reaction employed depend upon the type of reaction product desired. If, for example, it is desired to produce a monoamino substituted product as the major reaction product in a technical process, one can, for example, employ a nozzle in which cyanuric chloride vapors and superheated water-free ammonia are mixed and reacted and cooling the reaction products immediately upon leaving the nozzle. If, on the other hand, a product is desired which primarily contains monochloro-diamino triazine, a nozzle can also be employed to mix the reactants, but the gases leaving such nozzle are passed through a heated reaction tube which preferably is filled with inert filling bodies so that they are maintained at the reaction temperature for a longer period of time, for example, 4–5 seconds. The latter apparatus is also suitable for the production of melamine, but the inert filling bodies are preferably replaced by the above-mentioned catalysts.

In accordance with a special modification of the process according to the invention, it is also possible to carry out the reaction in the gas phase to produce a mixture of chloramine triazines and subsequently reacting the reaction product with aqueous ammonia at temperatures over 90° C., advantageously at 100 to 120° C. in an autoclave, whereby melamine is obtained as the major reaction product.

In order to avoid by-reactions which can occur between the starting material, cyanuric chloride, and the amino substituted triazines formed during the reaction, it is advantageous to employ an excess of ammonia for the reaction. The production of the by-products can also be suppressed by admixing inert gases such as nitrogen with the reactant gases, but generally the use of an excess of ammonia is preferred.

The process according to the invention offers special technical advantages when carried out with the cyanuric chloride produced in the gas phase by the process described in U. S. application Serial No. 232,711, filed June 21, 1951, as the vaporized cyanuric chloride obtained by such process can be directly reacted with superheated ammonia without requiring special additional apparatus. At the same time, the advantage is obtained that the cyanuric chloride does not have to be precipitated as a sublimate in a separate procedural step.

The chloramino triazines obtained according to the invention are valuable raw materials for the production of textile assistants, synthetic resins and lacquer resins, as in view of the reactivity of the chlorine and amino groups they can be modified in a known manner in many ways. The melamine which is obtainable according to the invention is characterized by an especially high degree of purity and lack of color.

The following examples will serve to illustrate several modifications of the process according to the invention.

*Example 1*

74 grams of cyanuric chloride preheated to a temperature of 220° C. and 110 to 120 liters of ammonia gas preheated to 420 to 480° C. were introduced per hour into a nozzle wound with an electric heating coil, in which the reaction took place. The reaction product left the nozzle in vapor form and was condensed as a snow white sublimate in a collecting vessel connected to the nozzle. The sublimate collected consisted of a mixture of ammonium chloride, dichloro-monoamino-triazine and monochloro-diamino-triazine and was obtained in an amount of 82.2 grams per hour.

This product (82.2 grams) was placed in a 1 liter autoclave of corrosion-resistant steel and heated together with 326 grams aqueous 25% ammonia and 166 cubic centimeters of water for three hours at a temperature between 100° and 105° C. After cooling the product was suction filtered and washed with water until chlorine free. After drying at 120° C., 45.1 grams of melamine were obtained which amounted to a yield of 90.3% calculated upon the cyanuric chloride. The product formed a clear solution in 50 times the quantity of water when the water was just brought to a boil. Analysis of the product indicated a 66.55% N content and 0% Cl content. By treating the mother liquor and wash water with nitric acid, 2.5 grams of melamine nitrate (corresponding to 1.6 grams of melamine) were precipitated so that the total yield of melamine was 93.5%.

When repeating the process of the example with larger quantities of ammonia the same result was obtained. For example, when 73.8 grams of cyanuric chloride vapor and 197 liters of ammonia gas were reacted per hour and the product autoclaved with aqueous ammonia, 45 grams of melamine per hour, a yield of 90.3%, based upon the cyanuric chloride introduced of the same degree of purity as above were obtained. A further 2.7 grams of melamine nitrate, corresponding to 1.8 grams of melamine were recovered from the mother liquor and wash water so that the total yield was 93.7%.

*Example 2*

40 grams of cyanuric chloride vapor preheated to 220° C. and 120 liters of ammonia gas preheated to 420 to 450° C. per hour were mixed in a nozzle and reacted in a glass tube filled with 6 mm. filling body rings maintained at a temperature of 420° to 450° C. The time the reaction mixture remained in the tube amounted to 5.3 seconds. The resulting while sublimate which was collected after 2½ hours' operation was separated into its constituents whereby 10.2 grams of dichloro-monamino triazine and 52.7 grams of monochloro-diamino-triazine were obtained which respectively corresponded to 11.4% and 66.5% or together 77.9% of the cyanuric chloride introduced.

I claim:
1. A process of producing reaction products of ammonia and cyanuric chloride which comprises reacting anhydrous ammonia and cyanuric chloride in the vapor phase at atmospheric pressure and temperatures over 250° C. in a reaction zone in the presence of a catalyst promoting splitting off of hydrogen chloride selected from the group consisting of cuprous chloride, barium chloride and active carbon, and continuously withdrawing the reaction products from the reaction zone.

2. A process in accordance with claim 1, in which said reaction is carried out in the presence of an excess of ammonia.

3. A process in accordance with claim 1, comprising in addition treating the reaction products in aqueous phase with ammonia at a temperature above 90° C. to produce a triazine reaction product primarily comprising melamine.

4. A process in accordance with claim 1, comprising in addition treating the reaction products in aqueous phase with ammonia at a temperature between 100° to 120° C. to produce a triazine reaction product primarily comprising melamine.

5. A process according to claim 1, in which the reaction is carried out at temperatures above 400° C. and the reaction mixture is maintained in the reaction zone for more than 3 seconds whereby a triazine reaction product primarily comprising monochloro-diamino-triazine is obtained.

6. A process of producing reaction products of ammonia and cyanuric chloride which comprises reacting anhydrous ammonia and cyanuric chloride in the vapor phase at atmospheric pressure and at temperatures between 420° and 480° C. in a reaction zone, the reaction mixture being maintained in the reaction zone for about 4 to 5 seconds whereby a triazine reaction product primarily comprising monochloro-diamino-triazine is obtained.

7. A process of producing reaction products of ammonia and cyanuric chloride which comprises reacting anhydrous ammonia and cyanuric chloride in the vapor phase at atmospheric pressure and temperatures over 250° C. in a reaction zone, the reaction mixture being maintained in the reaction zone for less than about 1 second, and continuously withdrawing the reaction products from the reaction zone whereby a triazine reaction product primarily comprising dichloro-monoamino-triazine is obtained.

References Cited in the file of this patent
UNITED STATES PATENTS 2,559,617    Hartigan _____ July 10, 1951

FOREIGN PATENTS 896,196    Germany _____ July 8, 1949

OTHER REFERENCES

P. B. Report, 73,508, 1943.